United States Patent
Otomo et al.

(10) Patent No.: US 10,816,421 B2
(45) Date of Patent: Oct. 27, 2020

(54) METAL ELASTIC ELEMENT AND DIAPHRAGM USING THE SAME

(71) Applicant: Seiko Instruments Inc., Chiba-shi, Chiba (JP)

(72) Inventors: Takuma Otomo, Chiba (JP); Yasunori Akasaka, Chiba (JP); Ryo Sugawara, Chiba (JP); Tomoo Kobayashi, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 332 days.

(21) Appl. No.: 15/904,931

(22) Filed: Feb. 26, 2018

(65) Prior Publication Data
US 2018/0259408 A1    Sep. 13, 2018

(30) Foreign Application Priority Data

Mar. 10, 2017   (JP) ................................. 2017-046255

(51) Int. Cl.
    *C21D 6/04*       (2006.01)
    *G01L 9/00*       (2006.01)
    (Continued)

(52) U.S. Cl.
    CPC ............ *G01L 9/0044* (2013.01); *C21D 6/004* (2013.01); *C21D 6/02* (2013.01); *C22C 38/001* (2013.01);
    (Continued)

(58) Field of Classification Search
    CPC .......... C21D 2201/05; C21D 2211/001; C21D 2211/005; C21D 6/004; C22C 38/44; G01L 19/0672; G01L 9/0044
    (Continued)

(56) References Cited

U.S. PATENT DOCUMENTS 8,226,780 B2 *   7/2012   Hatano ................. C22C 38/001
                                                                148/325
9,523,620 B2    12/2016   Otomo et al.
(Continued)

FOREIGN PATENT DOCUMENTS

EP    0659896 A1 *   6/1995   ............... E04C 5/08
EP    2759607 A1     7/2014
(Continued)

OTHER PUBLICATIONS

Extended European Search Report in European Application No. 18152718.5, dated Jun. 27, 2018, pp. 1-7.

*Primary Examiner* — Jie Yang
(74) *Attorney, Agent, or Firm* — Brinks Gilson & Lione

(57) ABSTRACT

An object of the present invention is to provide a metal elastic element which is suitable for sensing or the like of a fluid pressure change and exhibits favorable resilience even in the case of receiving a sudden pressure change, and also provide a diaphragm using the same. A metal elastic element of the present invention is composed of a two-phase stainless steel having a γ-phase and an α-phase, wherein the area ratio of the γ-phase is 40% or less, and the two-phase structure is a marble-like metal structure. In the invention, it is preferred that the element has a fiber texture in which <111>γ and <110>α are preferentially oriented parallel to the thickness direction.

8 Claims, 15 Drawing Sheets

(51) Int. Cl.
  *C22C 38/44* (2006.01)
  *C22C 38/04* (2006.01)
  *C22C 38/00* (2006.01)
  *C22C 38/02* (2006.01)
  *C21D 6/00* (2006.01)
  *C21D 6/02* (2006.01)
  *G01L 19/06* (2006.01)

(52) U.S. Cl.
  CPC ............ *C22C 38/002* (2013.01); *C22C 38/02* (2013.01); *C22C 38/04* (2013.01); *C22C 38/44* (2013.01); *C21D 2201/05* (2013.01); *C21D 2211/001* (2013.01); *C21D 2211/005* (2013.01); *G01L 19/0627* (2013.01); *G01L 19/0672* (2013.01)

(58) Field of Classification Search
  USPC ........................................................ 148/325
  See application file for complete search history.

(56) References Cited

U.S. PATENT DOCUMENTS

| | | |
|---|---|---|
| 2015/0078953 A1 | 3/2015 | Otomo |
| 2016/0186283 A1 | 6/2016 | Minami et al. |
| 2016/0215359 A1 | 7/2016 | Eguchi et al. |

FOREIGN PATENT DOCUMENTS

| | | |
|---|---|---|
| JP | 2014-141726 A | 8/2014 |
| JP | 2015-059247 A | 3/2015 |

\* cited by examiner

Fig. 8B

SAMPLE CORRESPONDENCE TABLE

| RESIDUAL DISPLACEMENT (μm) | Pole Figure No. | | |
|---|---|---|---|
| | SAMPLE A | SAMPLE B | SAMPLE C |
| 0.2 | (19) | | 55 |
| 0.3 | 24 | | 65, 71 |
| 0.4 | | (44), 50, 52 | 59, 63 |
| 0.5 | 03, 30, 32 | | 64 |
| 0.6 | 16, 23 | | |
| 0.7 | | 35, 42, 45 | 68 |
| 0.8 | | | 66, 69 |
| 0.9 | 08, 27 | | (54) |
| 1.0 | 17 | | |
| 1.1 | 02 | 36 | |
| 1.2 | (07) | (33), 48 | |
| 2.8 | 04 | | |
| 3.5 | (25) | | |

METAL ELASTIC ELEMENT AND DIAPHRAGM USING THE SAME

RELATED APPLICATIONS

This application claims priority under 35 U.S.C. § 119 to Japanese Patent Application No. 2017-046255 filed on Mar. 10, 2017, the entire content of which is hereby incorporated by reference.

BACKGROUND OF THE INVENTION

Field of the Invention

The present invention relates to a metal elastic element using a two-phase stainless steel, and a diaphragm using the same.

Background Art

In an industry that handles a fluid, a pressure is one of the important control items, and the stability of a sensor including a metal elastic element for monitoring a pressure change is an essential technical factor that supports the industry. A factor that eliminates the sensing accuracy of the elastic element has been considered to be corrosion of a portion in contact with the fluid. It has been considered that a pressure receiving surface of the metal elastic element is exposed to a fluid having various liquid properties or a cleaning agent for a pipe, resulting in reduction in the thickness due to corrosion, and thus, the surface is plastically deformed.

In view of this, the present inventors have considered that the improvement of corrosion resistance is essential for improving the quality of the elastic element, and have solved the problem of the corrosion resistance of the metal elastic element by applying a two-phase stainless steel having excellent corrosion resistance as a material (see JP-A-2015-059247 (Patent Document 1) and JP-A-2014-141726 (Patent Document 2)).

However, although the long-term stability is improved by improving the corrosion resistance, when a stress exceeding the elastic deformability of the element is generated by a sudden pressure increase due to water hammer received from the fluid as the measurement target, the metal elastic element may not be restored to the point 0 in some cases. For the metal elastic element, the restoration to the point 0 after releasing the pressure is an essential function as a sensor element, and it is necessary to perform accurate sensing also after a sudden pressure change. Water hammer is a phenomenon which occurs due to fluid inertia in a pipe, and is a general phenomenon caused by a routine operation when closing a valve or stopping a pump, or the like. Therefore, it is important to take measures for water hammer in the metal elastic element for further improving the quality.

It is considered that the resilience of the metal elastic element has a relationship with the magnitude of the restoration ability to return to the original shape after unloading. As a general property of a material, a material including a larger elastic region has a higher ability to store the load as an elastic energy. Further, a material exhibiting a higher proof stress has a higher stress level to shift the deformation mode from elastic deformation to plastic deformation, and the elastic region is relatively enlarged.

That is, as a scenario for solving the problem of the metal elastic element for a sensor, the following is derived from the finding of material science: when the proof stress or strength of a material is enhanced, the elastic deformability is improved, and thus, the resilience to the point 0 is improved. However, the above problem has not been solved so far, and the fact is that a clear relationship between a macro-material strength and the resilience of the metal elastic element has not been found.

With respect to the inference from the conventional finding that "a material exhibiting a higher proof stress has higher resilience", the present inventors obtained the experimental results as shown below, and fundamental improvement of the quality of the metal elastic element was not achieved.

(1) With respect to the simulation value of the maximum stress generated in a metal elastic element when loading a pressure, even if a metal elastic element obtained using a two-phase stainless steel exhibiting a sufficient proof stress as a material is used, the metal elastic element does not exhibit expected resilience.

(2) In the metal elastic element, the deviation of the material strength is equivalent to that of the accuracy of a tensile testing machine, and reproducibility is observed, however, there is a tendency that as the material strength increases, the deviation of the resilience increases.

SUMMARY OF THE INVENTION

The present invention has been made in view of the conventional circumstances as described above, and an object of the invention is to provide a metal elastic element which is suitable for sensing or the like of a fluid pressure change and exhibits favorable resilience even in the case of receiving a sudden pressure change, and also provide a diaphragm using the same.

In order to achieve the above object, the metal elastic element of the invention includes a two-phase stainless steel having a γ-phase and an α-phase, wherein the area ratio of the γ-phase is 40% or less, and the two-phase structure is a marble-like metal structure.

In the invention, it is preferred that the element has a fiber texture in which <111>γ and <110>α are preferentially oriented parallel to the thickness direction.

In the invention, it is preferred that after loading a test load which is 52 to 80% of the proof stress, a residual displacement after unloading is 1.3 μm or less.

In the invention, it is preferred that the two-phase stainless steel has the following composition: Cr: 24 to 26 mass %, Mo: 2.5 to 3.5 mass %, Ni: 5.5 to 7.5 mass %, C: 0.03 mass % or less, and N: 0.08 to 0.3 mass %, with the balance consisting of Fe and unavoidable impurities.

A diaphragm of the invention includes the metal elastic element according to any of the above descriptions.

According to the invention, a metal elastic element which is composed of a two-phase stainless steel, and therefore exhibits a high proof stress and has excellent corrosion resistance, and also has excellent resilience with respect to the maximum stress which can be assumed to act thereon when loading a pressure, and moreover has a small deviation of the resilience, and can reduce the variation in the resilience among products can be provided. Further, according to the diaphragm of the invention, a diaphragm which exhibits a high proof stress, has excellent corrosion resistance, has high resilience, and has less variation in the resilience among products can be provided.

BRIEF DESCRIPTION OF THE DRAWINGS

FIG. 4A is a transverse cross-sectional view and FIG. 4B is a plan view.

FIG. 5A is a photograph of the metal structure of a sample having a γ-phase ratio of 45.5%, FIG. 5B is a photograph of the metal structure of a sample having a γ-phase ratio of 40.7%, and FIG. 5C is a photograph of the metal structure of a sample having a γ-phase ratio of 30.4%.

FIGS. 8A, 8B and 8C are views showing elastic displacements measured using a plurality of metal elastic element samples, pole figures of the respective samples, and a relationship between orientation and resilience.

DETAILED DESCRIPTION OF THE PREFERRED EMBODIMENTS

Hereinafter, an embodiment of a diaphragm composed of a metal elastic element of a two-phase stainless steel according to the invention, and an embodiment of a pressure sensor including the diaphragm will be described.

Figure 1:
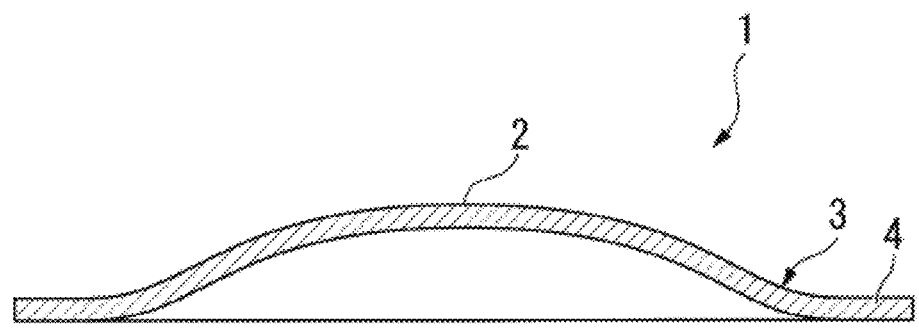
FIG. 1 is a schematic cross-sectional view showing a first embodiment of a diaphragm to which a metal elastic element according to the invention is applied.
Figure 2:
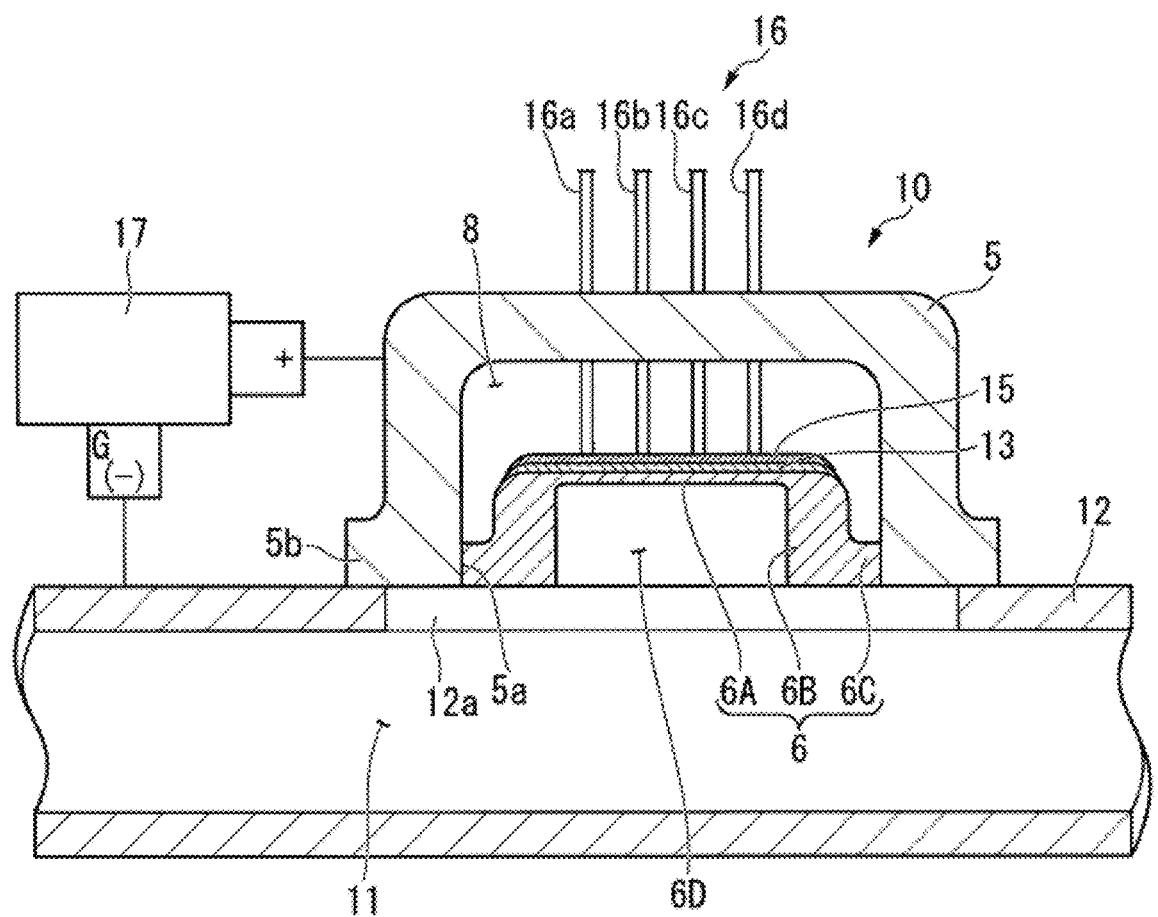
FIG. 2 is a schematic cross-sectional view showing an embodiment of a pressure sensor including the diaphragm to which the metal elastic element according to the invention is applied.

A diaphragm 1 of this embodiment can adopt a structure including a dome portion 2 in the shape of a partial spherical shell (in the shape of a dome) with a curvature radius in which a central portion protrudes upward, and a flange portion 4 continuously formed at the periphery of the dome portion 2 through a boundary portion 3 as one form. The diaphragm 1 in this form is housed in a casing or the like (not shown) and attached to a pipe or the like. Then, the diaphragm 1 is deformed by receiving the pressure of a fluid flowing inside the pipe and therefore is used for the measurement or the like of the fluid pressure. One example of applying such a diaphragm to a pressure sensor is shown in FIG. 2.

Figure 3:
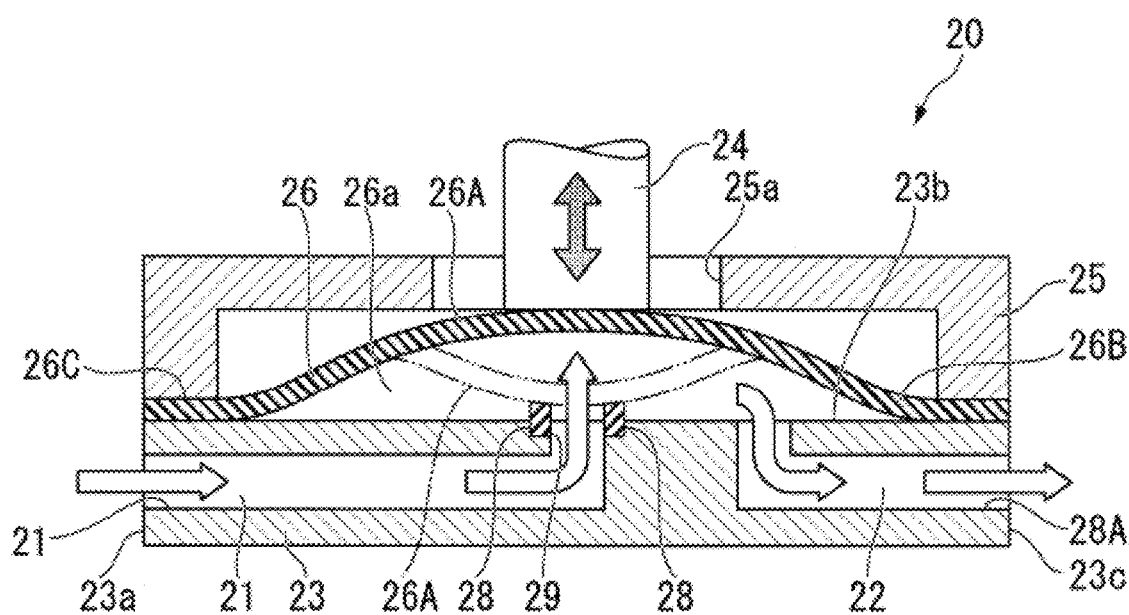
FIG. 3 is a schematic cross-sectional view showing an embodiment of a diaphragm valve including the diaphragm to which the metal elastic element according to the invention is applied.

Further, the diaphragm is housed in a casing or the like (not shown) and is used for a diaphragm valve or the like which opens and closes a flow path inside the casing. One example of applying the diaphragm to a diaphragm valve is shown in FIG. 3. Further, by forming a strain gauge on the diaphragm through an insulating layer, the resulting material can be utilized as a pressure sensor. One example of applying the diaphragm to a pressure sensor including a strain gauge is shown in FIG. 4.

The application example of the diaphragm is not limited thereto and various forms can be conceived, however, in any form, such a diaphragm is composed of a two-phase stainless steel which will be described in detail later, and has characteristics that a high strength can be achieved, the corrosion resistance is high, and a smooth surface state (a mirror finished surface) can be obtained.

As the two-phase stainless steel constituting the diaphragm 1, a two-phase stainless steel having the following composition: Cr: 24 to 26 mass %, Mo: 2.5 to 3.5 mass %, Ni: 5.5 to 7.5 mass %, C: 0.03 mass % or less, and N: 0.08 to 0.3 mass %, with the balance consisting of Fe and unavoidable impurities can be adopted. Further, in addition to the above-mentioned compositional ratio, in the two-phase stainless steel, as another additional element, it is also possible to add Mn in an amount of 2.0 mass % or less, and further, Si may be contained in an amount of 1.0 mass % or less.

It should be noted that with respect to the range of the content of a component described in this embodiment, the upper limit and the lower limit are assumed to be included unless otherwise specified. Therefore, "Cr: 24 to 26 mass %" means that Cr is contained in an amount of 24 mass % or more and 26 mass % or less.

The two-phase stainless steel which forms the diaphragm 1 has a two-phase structure in which the ratios of an austenite phase (γ-phase) and a ferrite phase (α-phase) are in a close range, and also has the above-mentioned compositional ratio. However, it is not necessary that the ratios of the austenite phase and the ferrite phase be the same, and it is only necessary that the two phases coexist in the structure. The reasons for limiting the respective components will be described below.

Cr (chromium): Cr is needed for forming a stable passive film required for protection from atmospheric corrosion, and 20 mass % or more of Cr is needed as the two-phase stainless steel, however, in order to achieve necessary corrosion resistance, strength, and the like in the diaphragm 1 of this embodiment, about 24 to 26 mass % of Cr is needed.

Mo (molybdenum): Mo assists Cr to impart pitting corrosion resistance to the two-phase stainless steel. By including Mo in an amount of about 2.5 to 3.5 mass % with respect to the two-phase stainless steel containing Cr in an amount within the above range, the resistance to pitting corrosion or crevice corrosion can be improved as compared with the case where only Cr is contained.

N (nitrogen): N enhances the pitting corrosion resistance and the crevice corrosion resistance of the two-phase stainless steel. Further, N contributes to the improvement of the strength of the two-phase stainless steel, and therefore is an effective solid solution strengthening element. N also contributes to the improvement of toughness, and therefore is preferably contained in an amount of 0.08 to 0.3 mass %.

When defining a black portion as an α-phase and a light grey portion as a γ-phase as shown in the photographs of the metal structure in FIGS. 5B and 5C obtained in the below-mentioned Examples, the marble-like structure refers to a structure which is composed of the black α-phase in which fine filaments, as if they were drawn with a brush, with a long indefinite form and a large aspect ratio are entangled and the γ-phase which fills the periphery of the α-phase.

Ni (nickel): Ni promotes the change of the crystal structure of stainless steel from a body-centered cubic (ferrite) to a face-centered cubic (austenite), and contributes to the stabilization of the austenite phase, and is needed also for ensuring the workability. Due to this, Ni is preferably contained in an amount of 5.5 to 7.5 mass %.

C (carbon): Carbon suppresses the formation of a carbide which causes brittleness, and therefore is preferably contained in a small amount. Due to this, the content of C is set to 0.03 mass % or less. Further, when C exists in the structure in a state of being bonded to Cr, corrosion is caused from the grain boundary, and therefore, the amount of C is preferably low.

The two-phase stainless steel may contain Si in an amount of 1.0 mass % or less and Mn in an amount of 2.0 mass % or less as other additional elements. Further, it may contain other unavoidable impurities in an amount of about 0.5 mass %. As the unavoidable impurities, P, S, Al, etc. can be exemplified.

The two-phase stainless steel having the above-mentioned compositional ratio is smelted in an inert gas from a molten alloy having the above-mentioned composition, and the diaphragm can be obtained from a slab by processing into a desired shape, a disk shape, or a dome shape using a conventional method such as forging, hot rolling, cold rolling, or swaging.

In order to achieve the object of this embodiment, processing is performed at an area reduction ratio of 50% or more, or at an area reduction ratio of 80% or more by cold working, for example, cold swaging, followed by annealing as needed, and the resulting material can be used.

The two-phase stainless steel having the above-mentioned composition may also be subjected to an aging heat treatment at 300 to 500° C. By performing this aging treatment, the two-phase stainless steel can be age-hardened, and thus, the two-phase stainless steel which has excellent corrosion resistance and exhibits a high proof stress of about 1400 MPa to 1750 MPa at 0.2% proof stress can also be obtained. Incidentally, in the case where an aging heat treatment is performed after processing into a diaphragm shape by the above-mentioned processing, a diaphragm which has excellent corrosion resistance and exhibits a high proof stress of about 1400 MPa to 1750 MPa at 0.2% proof stress can be obtained.

The age hardening of the two-phase stainless steel is a phenomenon previously found by the present inventors. Further, when the two-phase stainless steel having the above-mentioned compositional ratio is subjected to aging by performing a heat treatment at a temperature exceeding 500° C., for example, at 650° C., the proof stress and the tensile strength are improved, however, an elongation at rupture is not obtained, and brittle fracture is exhibited immediately after completion of elastic deformation in a tensile test. Further, in the case where the heat treatment temperature is as low as about 200° C., the age hardening ratio is low, and the hardness becomes lower than the hardness at room temperature depending on the conditions of the area reduction ratio.

Due to this, the heat treatment temperature is preferably in the range of 300 to 500° C., more preferably in the range of 350 to 500° C. By effectively applying the above-mentioned aging heat treatment, the two-phase stainless steel exhibiting a proof stress of 1500 MPa or more is obtained.

In the case where the diaphragm 1 is composed of the two-phase stainless steel obtained by the above-mentioned method, it is desirable that it has a marble-like structure as described above, and also the fiber texture of <111>γ+<110>α is oriented parallel to the thickness direction of the diaphragm 1.

If the diaphragm 1 is composed of the two-phase stainless steel, which has a marble-like structure, and in which the fiber texture of <111>γ+<110>α is oriented parallel to the thickness direction, the above-mentioned excellent proof stress and excellent corrosion resistance are exhibited, and at the same time, small slip deformation in the γ-phase which may occur in a low stress range which is lower than the proof stress can be suppressed.

According to this, the residual displacement after applying a pressure in the diaphragm 1 can be reduced, and thus, the diaphragm 1 with less variation can be provided.

Incidentally, in the case of the two-phase stainless steel having the above-mentioned marble-like structure, for example, the range of the proof stress to be obtained is assumed to be from 1400 to 1750 MPa, and after loading a test load which is 52 to 80% of the proof stress, the residual displacement after unloading can be decreased to 1.3 μm or less. Even if the test load is in the above-mentioned range, in the case where the two-phase stainless steel exhibits a proof stress of 1400 MPa, the test load is desirably in the range of 65 to 80%, in the case where the two-phase stainless steel exhibits a proof stress of 1500 MPa, the test load is desirably in the range of 61 to 74%, and in the case where the two-phase stainless steel exhibits a proof stress of 1750 MPa, the test load is desirably in the range of 52 to 64%. That is, as the test load for the two-phase stainless steel having the marble-like structure, in the case where the two-phase stainless steel exhibits a proof stress of 1400 to 1750 MPa, the test load can be selected from the range of 52 to 80%.

In the case where the test load within such a range is loaded, the two-phase stainless steel in which a residual displacement after unloading is 1.3 μm or less can be provided.

FIG. 2 shows a structure of an embodiment in which the diaphragm composed of the above-mentioned two-phase stainless steel is applied to a pressure sensor.

A pressure sensor 10 shown in FIG. 2 includes a cap member 5 including an introduction path through which a fluid as the target for measurement of a pressure and a diaphragm 6 integrated inside the cap member 5. This diaphragm 6 includes a thin-walled pressure receiving portion 6A, a cylindrical portion 6B extended so as to surround the outer periphery of the pressure receiving portion 6A, and a flange portion 6C formed on the outer periphery of the cylindrical portion 6B, and the inner space of the cylindrical portion 6B serves as a pressure chamber 6D.

The cap member 5 is in a cup shape with an opening portion 5a and includes a flange portion 5b on the outer peripheral side of the opening portion 5a, and the inner periphery of the opening portion 5a and the flange portion 6C of the diaphragm 6 are bonded to each other. The cap member 5 is constituted by a metal or a composite material of a metal and a resin, or the like. In the inside of the cap member 5, a reference pressure chamber 8 is formed so as to be partitioned by the cap member 5 and the diaphragm 6. In the cap member 5, an inlet port (not shown) through which a reference gas is introduced is formed, and the reference gas is introduced from this inlet port, and the internal pressure of the reference pressure chamber 8 is controlled.

As shown in FIG. 2, when the pressure sensor 10 is attached to the periphery of an opening portion 12a formed on the peripheral wall of a pipe 12 forming a flow path 11 for a measurement target, and a fluid in the pipe 12 is introduced into the pressure chamber 6D of the diaphragm 6, the pressure receiving portion 6A can be deformed by receiving the pressure of the fluid.

In the pressure receiving portion 6A of the diaphragm 6, the surface on the reference pressure chamber 8 side is processed into a smooth surface, for example, a mirror finished surface, and an insulating film 13 such as a silicon oxide film and a bridge circuit 15 are formed. The bridge circuit 15 is constituted by four strain gauges (not shown), and to the strain gauges, wirings 16 such as connector wirings 16a, 16b, 16c, and 16d are connected, respectively.

When a reference gas is introduced into the reference pressure chamber 8, and the pressure of the fluid in the pipe 12 is applied to the pressure chamber 6D, the pressure receiving portion 6A of the diaphragm 6 is deformed, and the resistance of the four strain gauges is changed due to this deformation, and therefore, the change in the resistance can be measured by the bridge circuit 15. By performing calculation using this measurement result, the pressure of the pressure chamber 6D can be detected. However, the pressure receiving portion 6A has a thin wall and directly receives the pressure of the fluid, and therefore, it is necessary that the metal material constituting the pressure receiving portion 6A of the diaphragm 6 have a high strength and excellent corrosion resistance.

Further, in the case where the pipe 12 is a pipe for use in the food or pharmaceutical field, in order to maintain hygiene control of the pipe 12, a non-oxidizing acidic cleaning liquid is used in some cases. In order to prevent corrosion of such a pipe, in the case where a cathodic protection method is applied, and corrosion measures are taken by applying a specific potential to the pipe 12, a power supply 17 is connected to the pressure sensor 10 and the pipe 12. The ground side (cathode side) of this power supply 17 is connected to the pipe 12, and the anode side is connected to the cap member 5 of the pressure sensor 10, and a potential difference is applied between these members.

In this manner, when a potential difference is generated, the pipe 12 itself can be cathodically protected, however, the diaphragm 6 may be polarized toward the anode side depending on the conditions, and as a result, there is a tendency that the thin-walled pressure receiving portion 6A of the diaphragm 6 is preferentially corroded. Also in the case as described above, it is necessary that the pressure receiving portion 6A of the diaphragm 6 have favorable corrosion resistance.

It is preferred that the metal material constituting the pressure receiving portion 6A of the diaphragm 6 for which a high strength is demanded and excellent corrosion resistance is required even in a corrosive environment to which a cathodic protection method is applied as described above is composed of a two-phase stainless steel which has the above-mentioned composition, and has a high strength, high corrosion resistance, and favorable resilience. Further, unlike a precipitation strengthened alloy, there is no fear that the two-phase stainless steel is partially preferentially polished even in the case where the surface is smoothly polished into a mirror finished surface or the like, and the two-phase stainless steel can be uniformly polished, and thus, a smooth surface such as a mirror finished surface can be reliably obtained by polishing. In the case where a smooth surface is easily obtained, when the pressure receiving portion 6A of the diaphragm 6 is constituted by the two-phase stainless steel and a circuit such as a strain gauge is formed on polished one surface of the pressure receiving portion 6A, the strain gauge can be accurately formed, and therefore, the ease of obtaining a smooth surface is advantageous in the case where a pressure sensor having high pressure detection accuracy is obtained.

Further, in the case of the diaphragm 6 which is composed of the two-phase stainless steel subjected to the above-mentioned aging effect treatment and is subjected to an aging heat treatment, the diaphragm 6 can have an excellent strength such that the 0.2% proof stress is in the range of 1300 to 1700 MPa, and even in the case where the diaphragm 6 receives a high pressure from the fluid in the pipe 12, the diaphragm 6 is not plastically deformed, and has a wide elastically deformed region, and therefore, can maintain highly accurate pressure detection performance in a wide pressure range. Further, when the metal structure of the two-phase stainless steel is made a marble-like structure, in the case where it receives a high pressure due to water hammer or the like, the variation in the resilience of the diaphragm 6 to restore to the point 0 can be suppressed.

FIG. 3 shows a form to which the diaphragm according to the invention is applied to a diaphragm valve, and a diaphragm valve 20 in this form includes a plate-shaped body 23, in which a first flow path 21 and a second flow path 22 are formed, a diaphragm 26 placed on the body 23, and a lid 25 sandwiching the diaphragm 26 along with the body 23. In the inside of the body 23, the first flow path 21 reaching a central portion of an upper surface 23b of the body 23 from one side surface 23a of the body 23, and the second flow path 22 reaching the vicinity of the central portion of the upper surface 23b of the body 23 from the other side surface 23c of the body 23 are formed. A portion where the first flow path 21 is opened on the one side surface 23a in the body 23 is used as an inflow port 27, and a portion where the second flow path 22 is opened on the other side surface 23c in the body 23 is used as an outflow port 28A.

A peripheral step portion 28 is formed in a portion with which the first flow path 21 communicates on the central side of the upper surface of the body 23, and to this peripheral step portion 28, a valve seat 29 is attached. The diaphragm 26 is composed of the same two-phase stainless steel as that of the diaphragm 1 described previously, and is formed into a disk dome shape composed of a dome portion 26A, a boundary portion 26B, and a flange portion 26C in the same manner as the diaphragm 1 described above.

This diaphragm 26 is sandwiched between the body 23 and the lid 25 so as to form a pressure chamber 26a with the upper surface 23b of the body 23 while facing the protruding side of the dome portion 26A upward.

Further, a through-hole 25a for inserting a stem 24 is formed in the central portion of the upper surface of the lid 25, and the stem 24 is placed so as to be in contact with the central portion of the upper surface of the diaphragm 26.

The diaphragm valve 20 having the above-mentioned configuration can disconnect the communication between the first flow path 21 and the second flow path 22 by lowering the stem 24 so as to deform the dome portion 26A of the diaphragm 26 downward as indicated by the two-dot chain line in FIG. 3, thereby pressing the dome portion 26A against the valve seat 29, and can connect the communication between the first flow path 21 and the second flow path 22 by raising the stem 24 so as to separate the dome portion 26A of the diaphragm 26 from the valve seat 29.

The diaphragm valve 20 can be used as a valve capable of switching the connection and disconnection of the communication between the first flow path 21 and the second flow path 22 according to the raising and lowering movement of the stem 24.

Also in the diaphragm valve 20 having the above-mentioned configuration, the diaphragm 26 is constituted by the above-mentioned two-phase stainless steel, and therefore, there is an effect that the excellent diaphragm valve 20 can be provided by including the diaphragm 26 having a high strength, excellent corrosion resistance, and excellent resilience to the point 0.

Figure 4A:
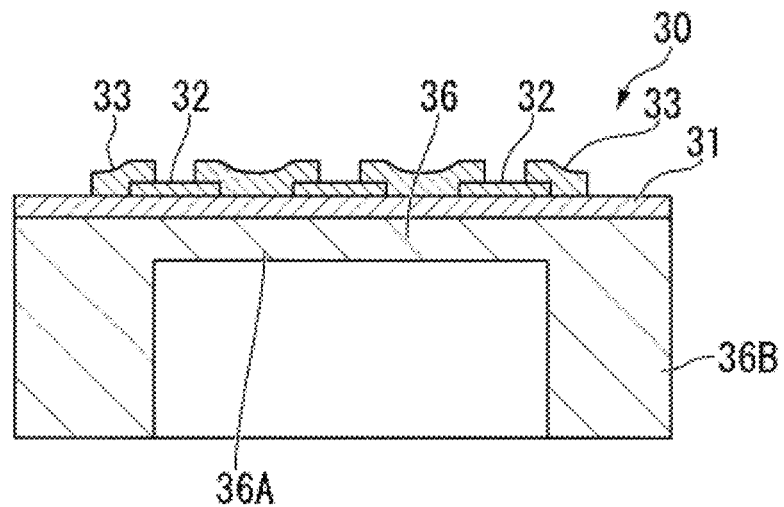
FIGS. 4A and 4B show another embodiment of the pressure sensor including the diaphragm to which the metal elastic element according to the invention is applied.
Figure 4B:
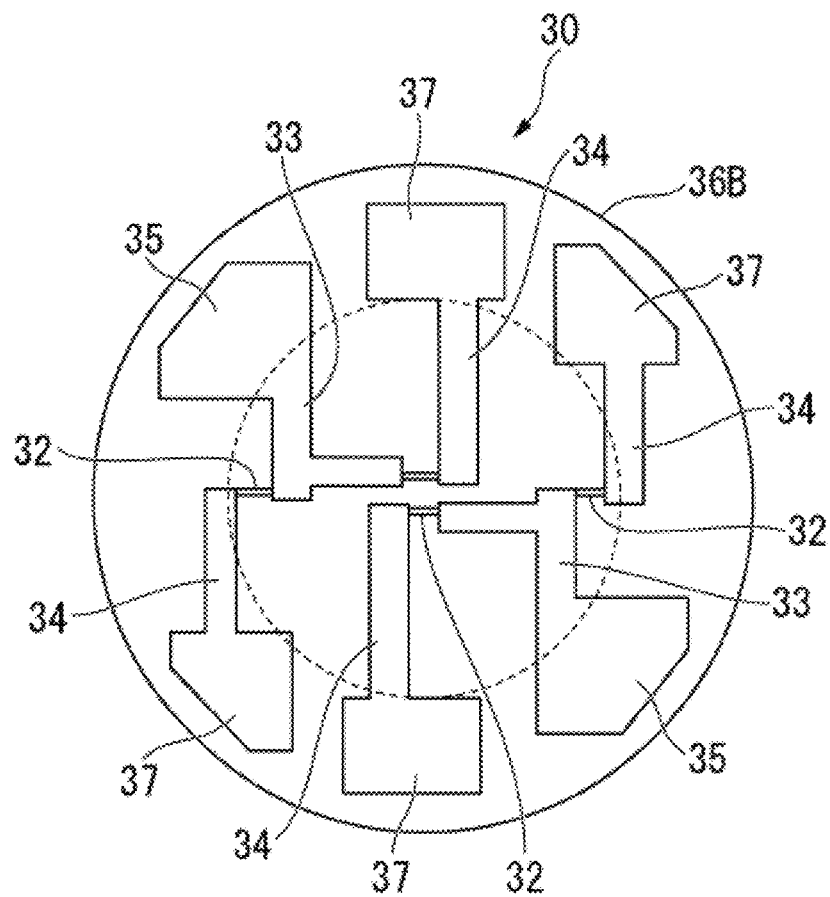

FIGS. 4A and 4B show a form to which the diaphragm according to the invention is applied to a pressure sensor, and a pressure sensor 30 in this form includes a diaphragm 36 having a thin-walled pressure receiving portion 36A composed of the above-mentioned two-phase stainless steel on the side of one end of a cylindrical portion 36B, and is constituted by four pressure sensitive resistance films 32 and six wiring layers connected to these pressure sensitive resistance films 32 on the upper surface side of the pressure receiving portion 36A through an insulating layer 31. One side end portion of each of two wiring layers 33 among the six wiring layers is connected to two pressure sensitive resistance films 32, and in the other side end portion of each of these two wiring layers 33, a terminal connection layer 35 is formed. Further, to one side end portion of each of the remaining four wiring layers 34, one pressure sensitive resistance film 32 is connected, and on the other side end portion of each of these wiring layers 34, a terminal connection layer 37 is formed. By connecting a measurement device to these terminal connection layers 35 and 37, a bridge circuit including the four pressure sensitive resistance films 32 can be constituted, and by utilizing this bridge circuit, a pressure applied to the pressure receiving portion 36A can be calculated from the resistance change of each of the pressure sensitive resistance films 32.

Also in the pressure sensor 30 having the above-mentioned configuration, the diaphragm 36 composed of the above-mentioned two-phase stainless steel is included in the same manner as the pressure sensor 10 of the above-mentioned embodiment, and therefore, there is an effect that the pressure receiving portion 36A has a high strength and therefore can withstand a high pressure, and further, even if a cathodic protection method is adopted for a pipe or the like, the diaphragm 36 having excellent corrosion resistance can be formed, and the pressure sensor 30 which has high measurement accuracy, excellent corrosion resistance, and excellent resilience to the point 0 can be provided.

As described above, in the above-mentioned embodiments, examples in which the diaphragm composed of the above-mentioned two-phase stainless steel is applied to each of the diaphragms whose specific structures are shown in FIGS. 1 to 4B have been described, however, the invention is not a technique applied only to the diaphragms having the respective configurations shown in FIGS. 1 to 4B, but can of course be applied generally and widely to diaphragms for use in various purposes.

Further, a metal elastic element composed of the two-phase stainless steel which has a high strength, favorable corrosion resistance, and favorable resilience to the point 0 as described above can of course be applied generally and widely to a thin plate material for use other than in the sensors, and can also be applied to a thin line or the like.

Further, in the embodiments shown in FIGS. 1 to 4B, the drawings are drawn by appropriately adjusting the reduced scale or shape of the respective portions of the diaphragm for facilitating the visualization, and therefore, it is a matter of course that the diaphragm according to the invention is not limited to the shape shown in the drawings.

Examples

Round bar samples (diameter: 50 mm) having a composition shown in the following Table 1 were used as the raw materials of Examples 1 and 2 and Comparative Example 1.

TABLE 1

| | Compositional ratio (mass %) | | | | | | | | |
|---|---|---|---|---|---|---|---|---|---|
| | Fe | Cr | Mo | Ni | N | P | Mn | S | Si | O |
| Example 1 | Bal. | 24.88 | 2.84 | 6.76 | 0.14 | 0.024 | 0.64 | 0 | 0.49 | 0.013 |
| Example 2 | Bal. | 24.88 | 2.84 | 6.76 | 0.14 | 0.024 | 0.64 | 0 | 0.49 | 0.013 |
| Comparative Example 1 | Bal. | 24.81 | 2.84 | 6.83 | 0.12 | 0.023 | 0.64 | 0 | 0.5 | 0.012 |

Each round bar sample was annealed at 1050° C., followed by water cooling, whereby a solid solution treatment was performed.

The forged material after water cooling was subjected to cold working, whereby a round bar sample having a diameter of 14 mm was obtained.

This round bar sample was cut into a round slice having a thickness of 5 mm, and thereafter, the section was subjected to mirror polishing and electrolytic etching, whereby a metal structure was visualized. In the electrolytic etching, a 3 M KOH aqueous solution was used, and the treatment was performed at a constant voltage of 1 to 3 V for 2 to 10 seconds as the electrolysis conditions.

The obtained test pieces having the respective compositions were observed using an optical microscope at a magnification of 100 times, and the ratio of the γ-phase to the α-phase constituting the two-phase stainless steel having each of the compositional ratios was measured.

In an X-ray diffraction test, as a heat source, a specific X-ray was irradiated using Cu, and the measurement was performed with a sweep angle (2θ) of 40 to 55° with a step size of 5°. The ratio of the γ-phase to the α-phase was evaluated from the height of a peak at 43.35 to 43.5° corresponding to the γ-phase (111) plane and the height of a peak at 44.50 to 44.55° corresponding to the α-phase (110) plane.

Figure 5A:
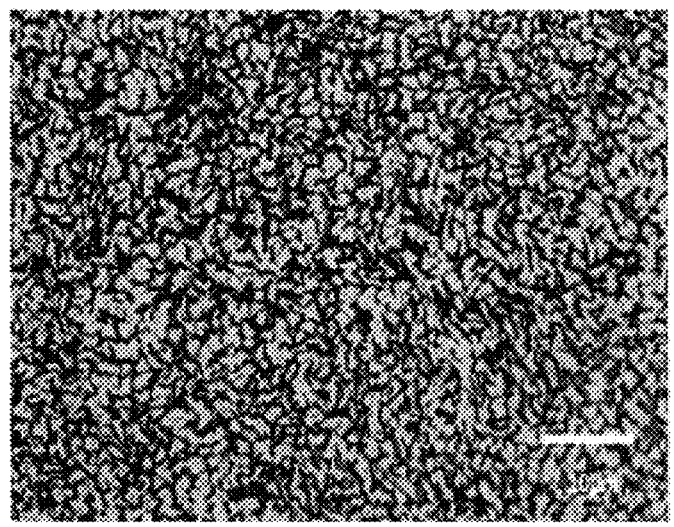
FIGS. 5A to 5C each show a metal structure of a two-phase stainless steel constituting the metal elastic element according to the invention.
Figure 5B:
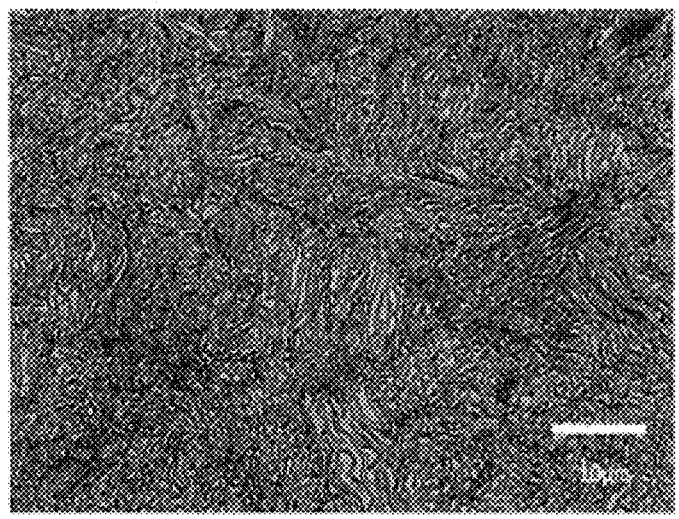
Figure 5C:
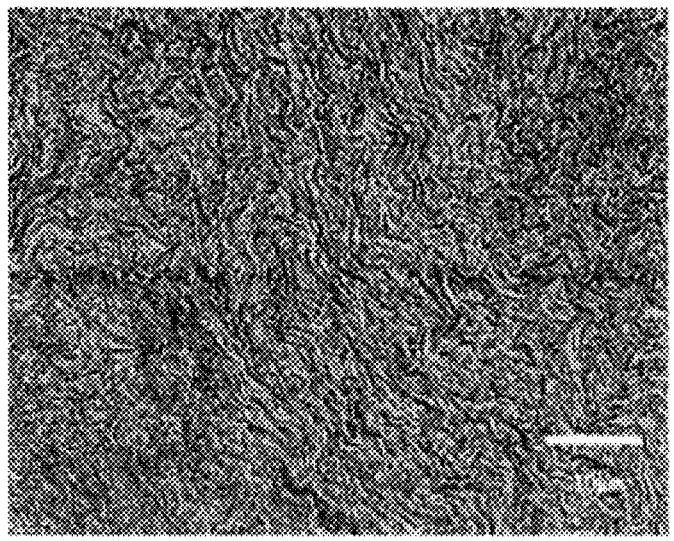

The results of observation of the structure of the obtained sample using the optical microscope at a magnification of 100 times are shown in FIGS. 5A to 5C. FIG. 5A shows a photograph of the metal structure of the sample having a γ-phase ratio of 45.5% (Comparative Example 1), FIG. 5B shows a photograph of the metal structure of the sample having a γ-phase ratio of 40.7% (Example 2), and FIG. 5C shows a photograph of the metal structure of the sample having a γ-phase ratio of 30.4% (Example 1).

The structure shown in FIG. 5B and the structure shown in FIG. 5C are each a marble-like structure, and a dark portion is the α-phase and a light grey portion is the γ-phase, and each shows a structure composed of a portion in which the dark α-phase in a fine filament-like shape, as if it were drawn with a brush, with a long indefinite form and a large aspect ratio is entangled and the γ-phase of the light grey portion which fills the periphery of the α-phase.

Further, FIG. 5A is a structure which can be referred to as "granular structure", and this granular structure shows a metal structure in which the boundary of grains in an indefinite form composed of the light grey γ-phase is filled with the black α-phase.

Figure 6:
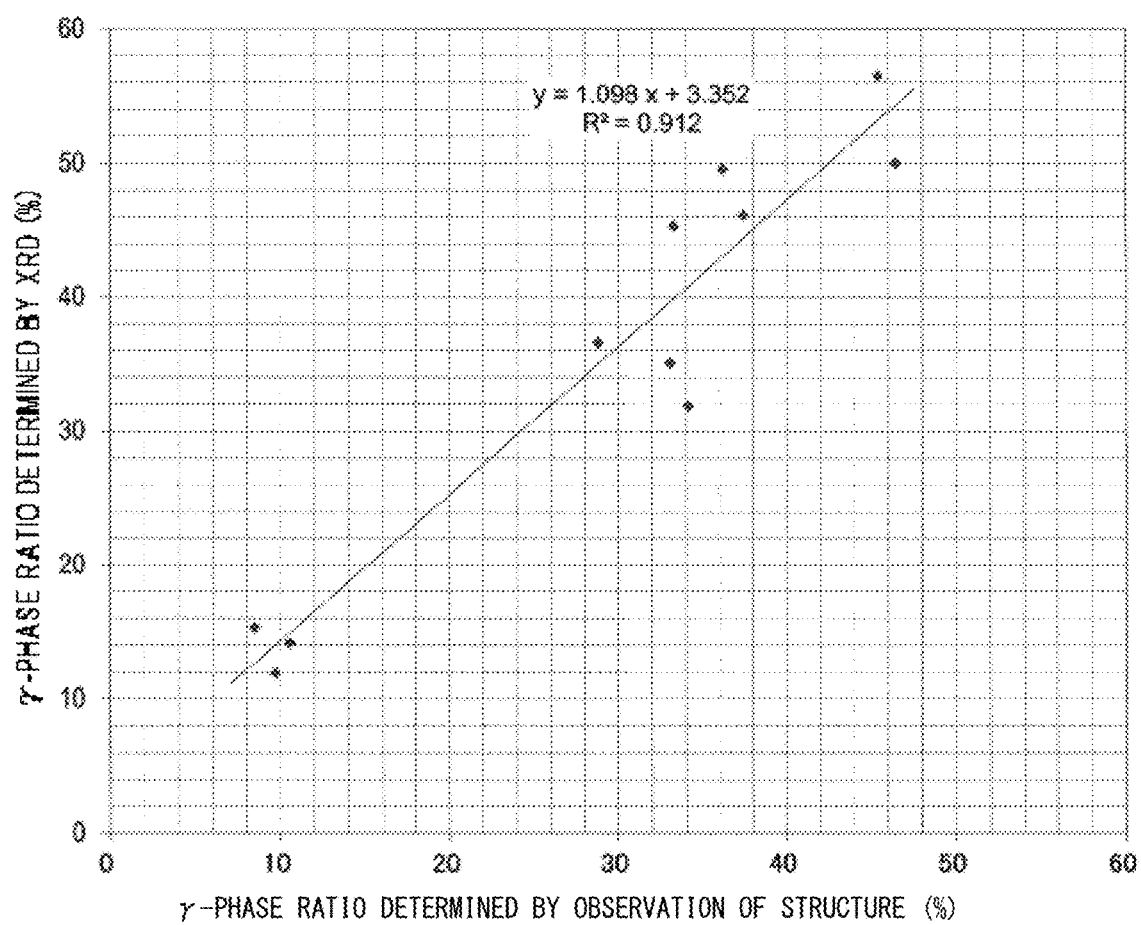
FIG. 6 is a view showing the correspondence between the microscopic observation results and the analytical results based on an XRD intensity ratio with respect to the ratio of a γ-phase to an α-phase in the two-phase stainless steel constituting the metal elastic element according to the invention.

FIG. 6 is a graph showing the correspondence relationship between the γ-phase ratio determined by the observation of the structure using an optical microscope and the γ-phase ratio determined by an XRD analysis.

From the results shown in FIG. 6, it is found that the γ-phase ratio determined by the observation of the structure using a microscope and the γ-phase ratio determined by an XRD analysis have an almost 1:1 correspondence, and therefore, an analysis of the ratio of the γ-phase to the α-phase is appropriate.

Figure 7:
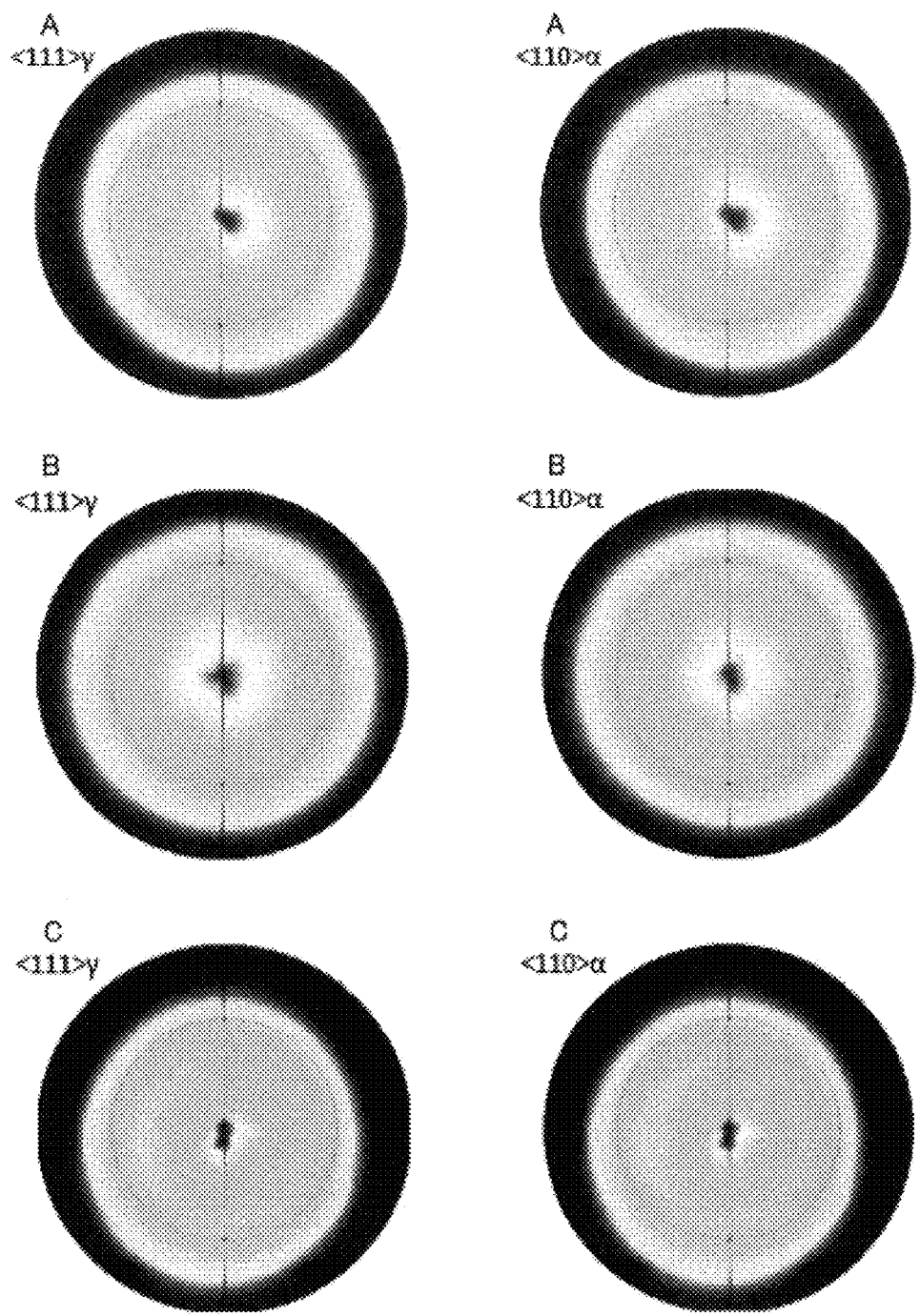
FIG. 7 shows pole figures showing the orientation of <111>γ and the orientation of <110>α of the two-phase stainless steel constituting the metal elastic element according to the invention.

FIG. 7 collectively shows the results when obtaining pole figures of the fiber textures of the sample having a γ-phase ratio of 45.5% (Comparative Example 1), the sample having a γ-phase ratio of 40.7% (Example 2), and the sample having a γ-phase ratio of 30.4% (Example 1).

The pole figures were obtained as follows. Bar samples of Examples 1 and 2, each having the above-mentioned composition, and a bar sample of Comparative Example 1 were used, and from each of these samples, a flat-bottomed dish-shaped diaphragm (the total outer diameter: 13 mm, the inner diameter of a thin-walled portion: 5 mm, the thickness of a thin-walled portion: 0.16 to 0.18 mm) was cut out by cutting work, and the bottom surface of the dish-shaped diaphragm was polished and used as the observation surface. The bottom surface of the dish-shaped diaphragm is a surface orthogonal to the central axis of the bar sample, and this plane was used as the observation surface.

From each of the pole figures shown in FIG. 7, it was found that in each sample, the <111> direction of the γ-phase (austenite phase) is oriented parallel to the longitudinal direction of the bar sample. Further, it was found that in each sample, the <110> direction of the α-phase (ferrite phase) is oriented parallel to the longitudinal direction of the bar sample.

From these results, it was revealed that the fiber texture in which <111>γ and <110>α are oriented parallel to the thickness direction of the bottom surface of the dish-shaped diaphragm is formed.

Figure 8A:
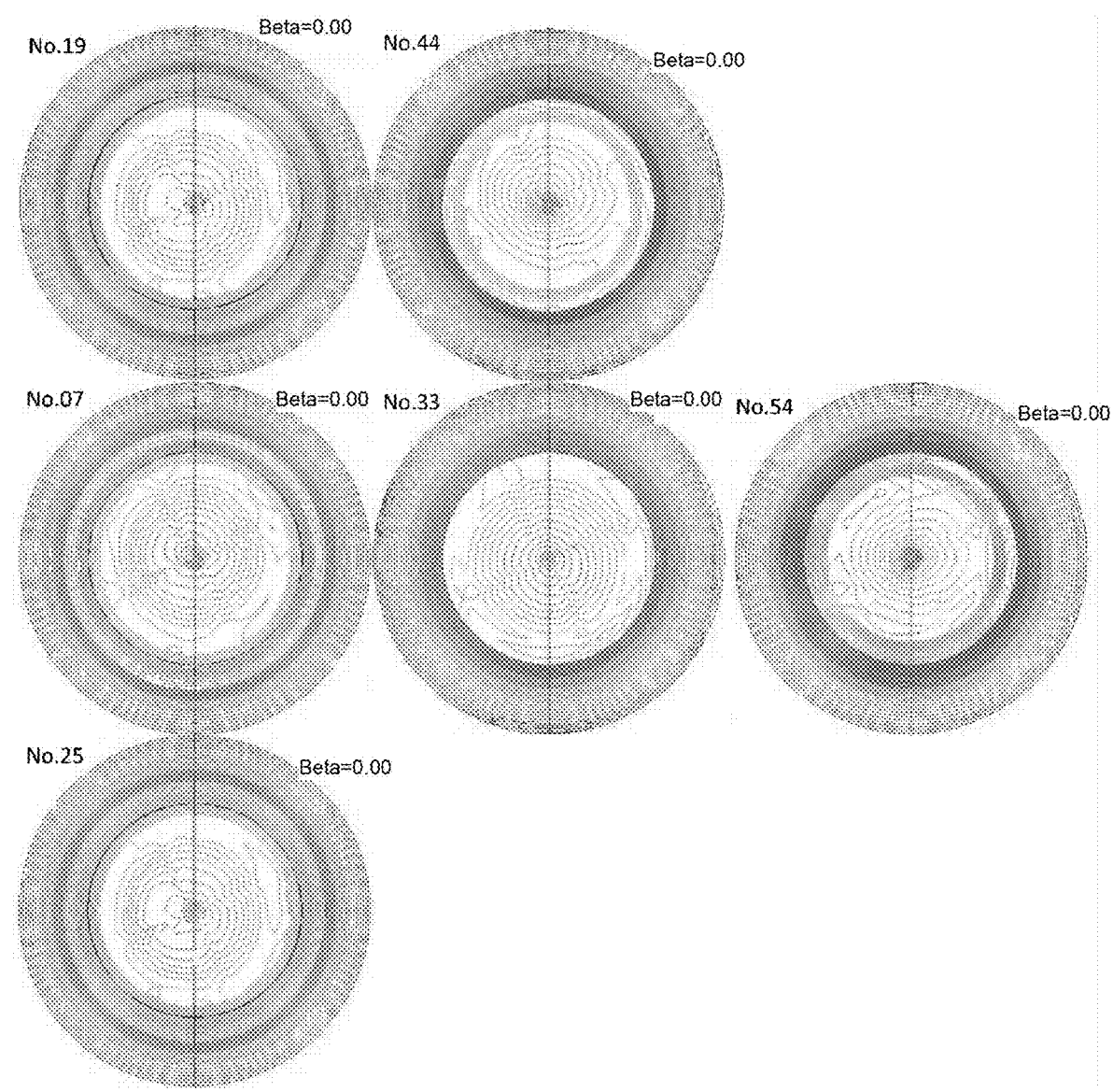
Figure 8C:
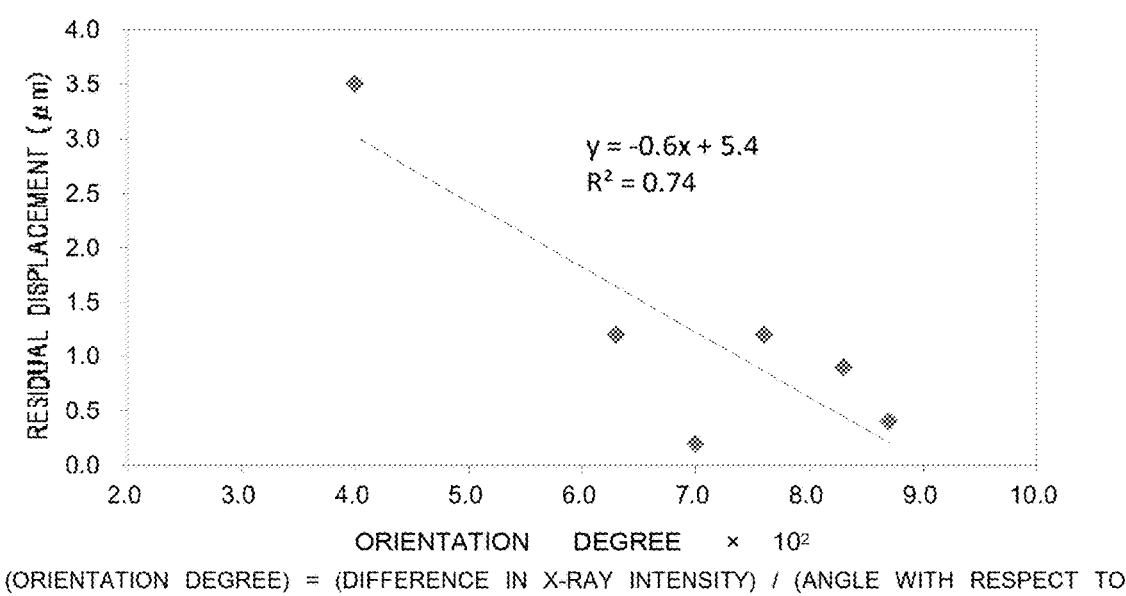

Subsequently, with respect to the samples of Examples 1 and 2 and the sample of Comparative Example 1 described previously, a sample was obtained by cutting an ingot after processing into a round slice having a thickness of 5 mm, and this sample was subjected to a heat treatment at 350° C. for 2 hours in vacuum, and thereafter gradually cooled, and the sample after gradual cooling was roughly polished with a polishing machine using a diamond suspension. To each sample after rough polishing, a load of 7 MPa was applied, and then, a residual displacement after unloading was measured. The measurement results are shown in FIGS. 8A through 8C. The "residual displacement" here refers to a displacement in the thickness direction after unloading at the center of the sample.

Incidentally, as the sample measured for the residual displacement, from a columnar sample obtained by cutting into a round slice as indicated by the chain line in FIG. 10, a quadrangular prism-shaped test piece in which the z-axis direction is fitted to the central axis direction as described later was cut out, and a load was applied in the z-axis direction as the compression axis direction, and the deformation behavior was examined.

Further, the proof stress of these samples of Examples is 1500 MPa or more, however, the stress generated in a stress concentration portion of each sample after rough polishing corresponds to 919 to 1120 MPa when performing calculation using a finite element method. Incidentally, why such a stress range occurs is because assuming that a variation in the size of the sample slightly occurs due to a variation at the time of preparation of the sample, the variation is assumed to fall within the range between the minimum value and the maximum value of the dimensional standard at the time of production. Therefore, a load corresponding to 61% to 75% of the proof stress is to be applied to the sample of each example.

Incidentally, the two-phase stainless steel having a composition used in the invention exhibits a proof stress in the range of 1400 to 1750 MPa according to the γ-phase ratio. When the minimum value and the maximum value of the dimensional standard in consideration of the calculation using a finite element method and the variation described above are estimated for the two-phase stainless steel exhibiting a proof stress of 1400 MPa, a load corresponding to 65% to 80% of the proof stress is to be applied to the sample. Further, when the minimum value and the maximum value of the dimensional standard in consideration of the calculation using a finite element method and the variation described above are estimated for the two-phase stainless steel exhibiting a proof stress of 1750 MPa, a load corresponding to 52% to 64% of the proof stress is to be applied to the sample.

Due to this, in the sample of the two-phase stainless steel exhibiting a proof stress in the range of 1400 to 1750 MPa, a load corresponding to 52% to 80% of the proof stress is to be applied.

In FIGS. 8A, 8B and 8C, the respective samples measured for the residual displacement were classified into strata according to the residual displacement for each of the Examples and Comparative Example, and distinguished (see the sample corresponding table shown in FIG. 8B), and with respective the samples for the representative data points, pole figures were obtained using X-ray diffractometry.

The results graphed according to the orientation degree (difference in X-ray intensity/angle with respect to surface normal) obtained from the pole figures and each residual displacement are shown in FIG. 8C.

In the examples shown in FIG. 8B, A indicates Comparative Example 1 (only 14 samples are shown), B indicates Example 2 (only 9 samples are shown), and C indicates Example 1 (only 10 samples are shown). The test was performed for 60 samples in Comparative Example 1, and 20 samples in each of Example 1 and Example 2.

The orientation degree represented by the horizontal axis of the graph shown in 8C is indicated by the degree of integration of crystal orientation. The pole figure shown in FIGS. 8A, 8B and 8C can be read in the same manner as the contour lines of a topographical map. That is, it can be known that as the spaces between the contour lines are denser, the crystal orientation is steeper.

In the results of this test, the orientation degree is determined by comparison of the X-ray diffraction intensities at a reference angle and at the center. Specifically, the orientation degree was indicated by the maximum change ratio of the X-ray intensity in the angle range of the center ±30°.

As shown in FIG. 8C, it was found that as the orientation degree of the sample is higher, the residual displacement is reduced. That is, it was found that the sample having a higher orientation degree has higher resilience after unloading.

From these results, it was found that the crystal orientation in the metal elastic element composed of the two-phase stainless steel greatly affects the resilience of the metal elastic element.

Figure 9:
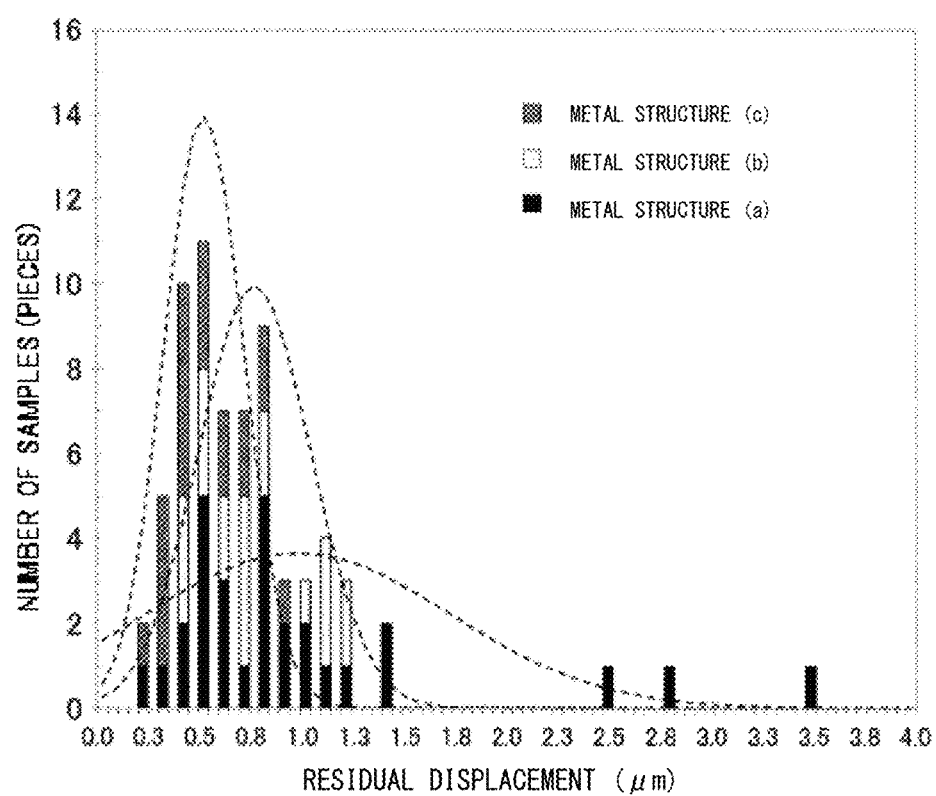
FIG. 9 is a graph showing a relationship between the elastic displacements measured using a plurality of metal elastic element samples and the number of pieces of the respective samples.

FIG. 9 is a graph showing the distribution of the number of samples with respect to the test results of obtaining the residual displacement shown in FIGS. 8A, 8B and 8C. The metal structure (a) indicates the distribution of the number with respect to the residual displacement in Comparative Example 1 having a granular structure shown in FIG. 5A, the metal structure (b) indicates the distribution of the number with respect to the residual displacement in Example 2 having a marble-like structure shown in FIG. 5B, and the metal structure (c) indicates the distribution of the number with respect to the residual displacement in Example 1 having a marble-like structure shown in FIG. 5C.

As found from the results of the residual displacement shown in FIG. 9, in the samples of Comparative Example 1, a large variation in the residual displacement occurs in the range of 0.3 to 3.5 µm, however, in the samples of Examples 1 and 2, the values of the residual displacement fall within a small range of 0.3 to 1.3 µm, and it was found that the variation is less.

From these results, it was found that in the metal elastic element composed of the two-phase stainless steel in this system, by forming the metal elastic element having a marble-like structure, the residual displacement can be made to fall within a small range of 0.3 to 1.3 µm.

Incidentally, the three peak curves indicated by the chain lines in FIG. 9 show the manner of variation estimated from the results calculated from the average values and the standard deviations with respect to the respective residual displacements while assuming that the residual displacement follows the normal distribution. When the standard deviation of the residual displacement of each sample in FIG. 9 was calculated, the average and standard deviation of the residual displacement of the sample of Comparative Example 1 was 1.3±0.8 µm, the average and standard deviation of the residual displacement of the sample of Example 1 was 0.8±0.3 µm, and the standard deviation of the residual displacement of the sample of Example 2 was 0.5±0.2 µm.

From these results, it is found that the difference in the metal structure of the two-phase stainless steel constituting the metal elastic element affects the average value and the variation of the residual displacement. In the results of Examples 1 and 2, the standard deviation of the residual displacement could be made to fall within the range of 0.8±0.3 µm.

Subsequently, from the bar sample having a diameter of 14 mm described above, as shown in FIG. 10, a quadrangular prism-shaped test piece (a test piece in which the central axis line of the bar sample passes through the center of the top surface and the bottom surface of the quadrangular prism, and the length direction of the quadrangular prism is made to coincide with the length direction of the bar sample) was cut out, whereby a sample for examining the deformation behavior was formed.

The length direction (the vertical direction of FIG. 10) of the quadrangular prism-shaped sample is the thickness direction (the z-axis direction: ND direction) of the quadrangular prism-shaped test piece, and with respect to the quadrangular prism-shaped test piece, the x axis and the y axis can be set as shown in FIG. 10. The size of the test piece was set to a quadrangular prism shape of 2 mm×2 mm×4 mm, and each surface was electrolytically polished to expose the structure so that the phases can be specified, and slip lines on each surface were observed with an SEM (scanning electron microscope) after a compression test. Further, the fibrous structure described previously extends in the length direction of the test piece by cold working.

Figure 10:
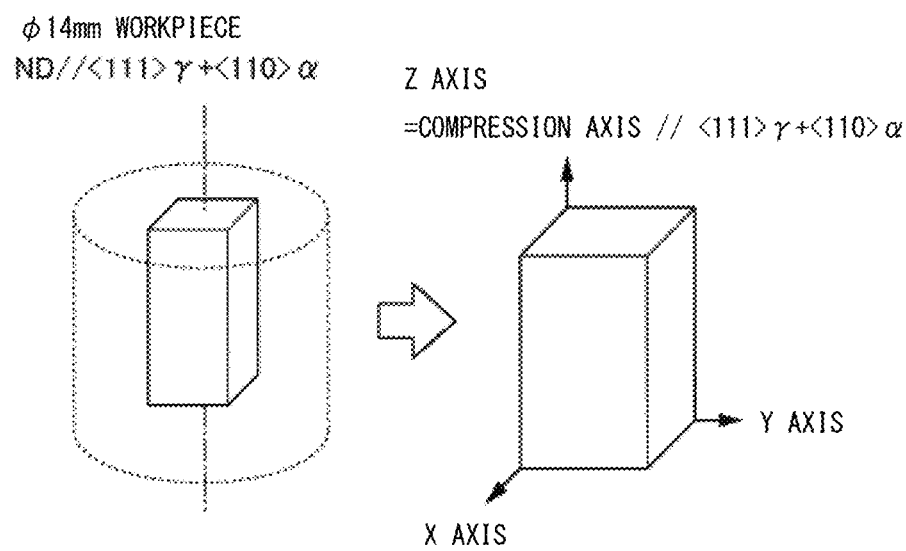
FIG. 10 is an explanatory view showing a relationship between the crystal orientation of the sample for which a residual displacement is obtained and the loading direction in a compression test.
Figure 11:
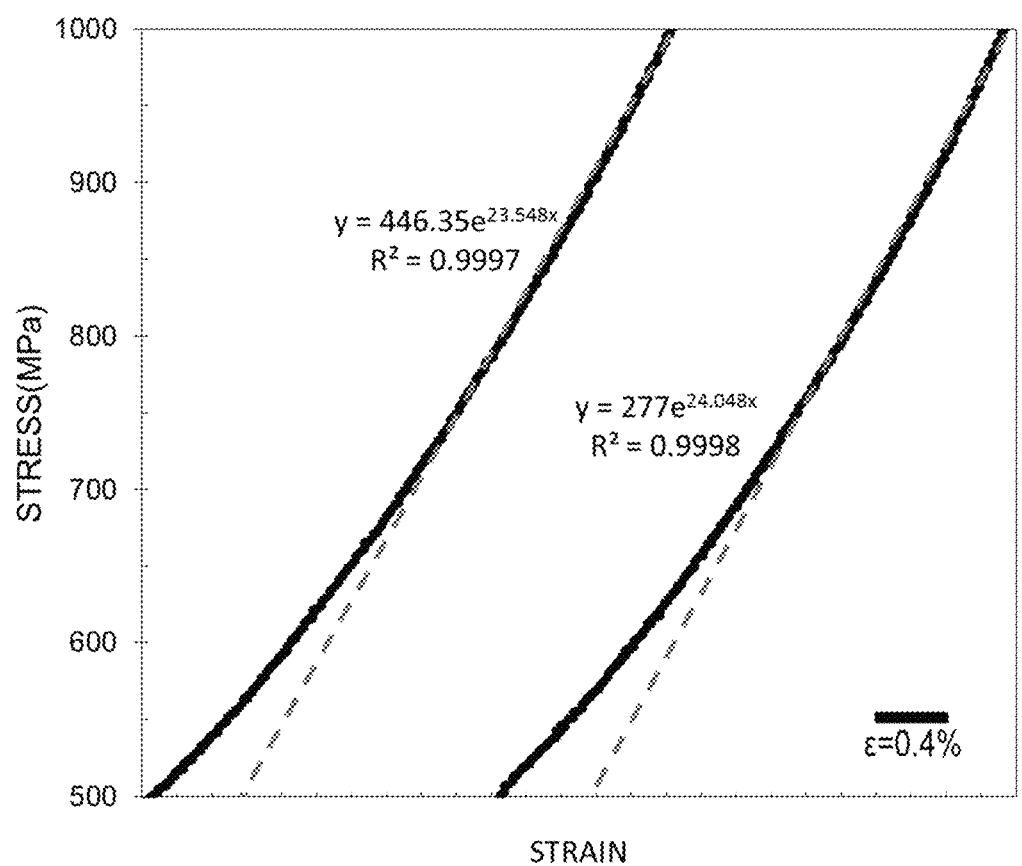
FIG. 11 is a graph showing one example of an S-S curve obtained by subjecting a sample to a compression test.

When a compression test, in which the test piece shown in FIG. 10 was used, and the test piece was compressed by applying a pressure to the test piece in the length direction thereof (z-axis direction), was performed, an S-S curve shown in FIG. 11 could be obtained.

What can be said from the S-S curve shown in FIG. 11 is that the S-S curve is linearly drawn in the range exceeding 700 MPa, however, the S-S curve is not linear and is curved in a low stress range of 700 MPa or less.

This means that displacement slightly occurs in the sample under a low stress far below the proof stress.

Figure 12:
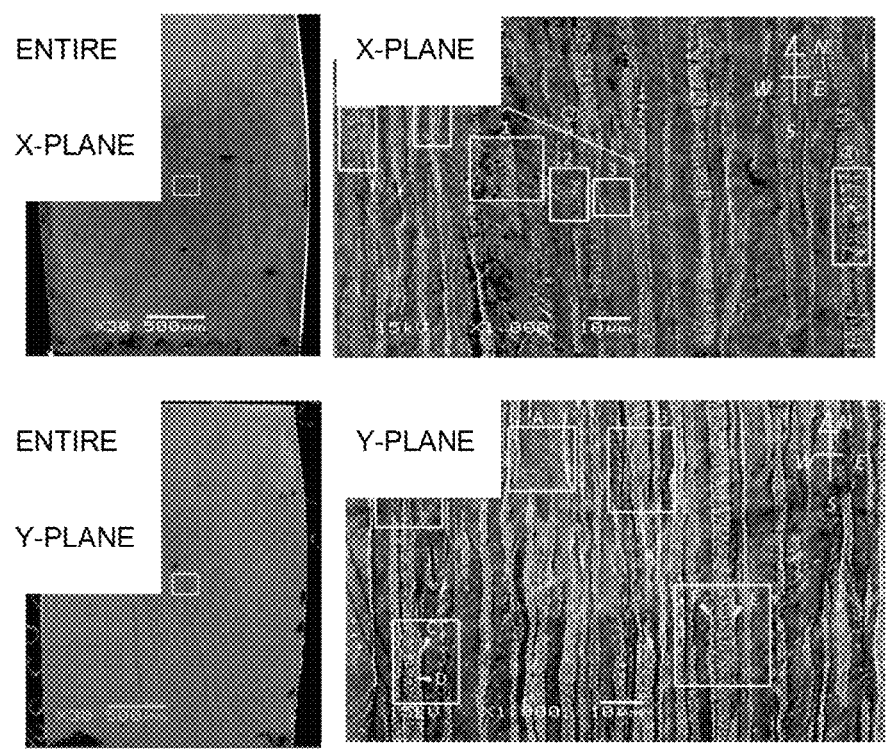
FIG. 12 shows photographs of the structures of the entire X-plane and the entire Y-plane of a sample subjected to a compression test and photographs of the structures showing places where a slip line analysis was performed by partially enlarging the X-plane and places where a slip line analysis was performed by partially enlarging the Y-plane.

FIG. 12 shows the results of observation of slip lines by subjecting the sections cut along the x-plane and the y-plane of the quadrangular prism-shaped test piece shown in FIG. 10 to mirror polishing, and performing microscopic observation. In FIG. 12, two upper and lower photographs disposed on the left side are photographs of the structure enlarged by 30 times, and two upper and lower photographs disposed on the right side are photographs of the structure enlarged by 1000 times.

Figure 13:
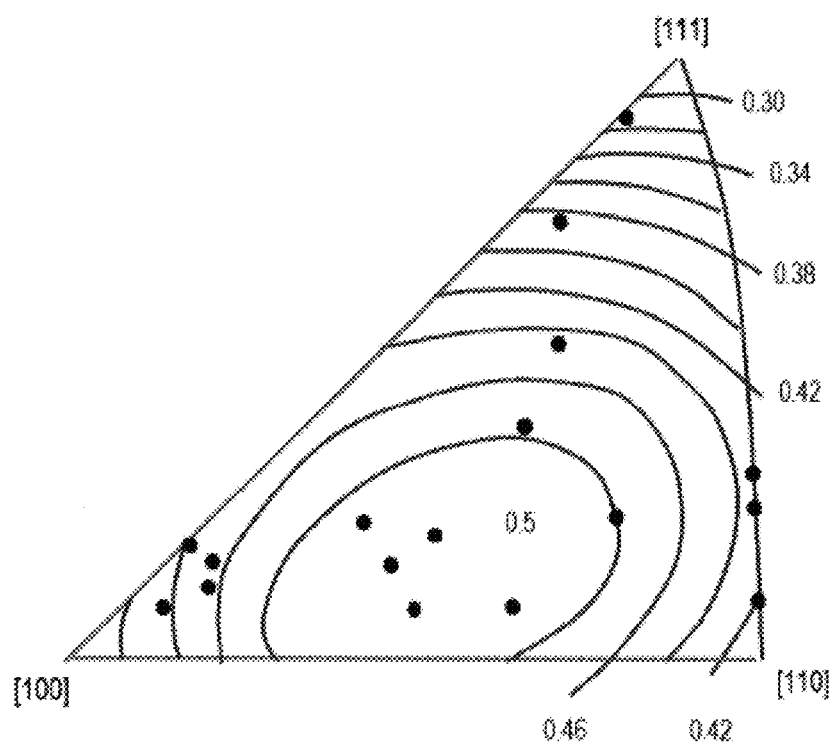
FIG. 13 is a plot showing a relationship between an active slip system estimated from the slip lines of the sample shown in FIG. 12 and a Schmidt factor of an FCC structure.

An orientation was approximately predicted from the slip line analysis and the orientation of the texture, and therefore, when an inverse pole figure was replotted for the orientation, a graph shown in FIG. 13 could be drawn.

More specifically, the slip lines which could be observed on the x-plane and the y-plane are plotted on a Wulff net for stereographic projection of crystal analysis, and a slip plane is estimated. Since the crystal orientation in the direction of the quadrangular prism of the loading axis is found from the pole figure described above, and therefore, the following is established: the loading axis//<111>γ+<110>α. The above-mentioned normal direction of the estimated slip plane and the above-mentioned crystal orientation of the loading axis can be obtained from the Wulff net. The graph of FIG. 13 shows a Schmid factor plotted on an inverse pole figure which is obtained from the combination of the slip system {111}<110> which is active in the γ-phase.

Incidentally, Schmid's Law is a law which specifies that a slip system which becomes active first among the plurality of existing slip systems is the primary slip system having the maximum Schmid factor, and the Schmid factor (=cos φ·cos λ) is a factor widely known as an indicator for the ease of slip deformation.

Here, φ represents an angle formed by the loading direction and the slip plane normal, λ, represents an angle formed by the loading direction and the slip direction, and the Schmidt factor takes a value in the range of 0.3 to 0.5, and the maximum value (0.5) is defined as a value when φ and λ, are as follows: φ=λ=45°.

In FIG. 13, a region indicated by 0.5 is a region where slip deformation is likely to occur, called Schmidt factor. In the case of a material exhibiting a proof stress level of 1800 MPa as in this example, the region of 0.3 to 0.5 shows 1800 MPa, however, from the slip line analysis shown in FIG. 12, it was found that there is a region where a slip system is active at around 1000 MPa and slip deformation occurs.

In the case of the two-phase stainless steel composed of the α-phase and the γ-phase, when a high stress is loaded, the γ-phase is work-hardened, and therefore, it can be presumed that plastic deformation occurs slightly at a loading level of 1000 MPa which is a considerably lower level than the proof stress. It is considered that this is a cause of the above-mentioned residual displacement.

What is claimed is:

1. A metal elastic element, comprising a two-phase stainless steel having a γ-phase and an α-phase, wherein the area ratio of the γ-phase is 40% or less, and the two-phase structure is a metal structure wherein the α-phase comprises a plurality of entangled filament shapes having a large aspect ratio and wherein the γ-phase fills a periphery of the α-phase, and wherein the element has a fiber texture in which <111>γ and <110>α are oriented substantially parallel to a thickness direction of the metal elastic element.

2. A diaphragm, comprising the metal elastic element according to claim 1.

3. The metal elastic element according to claim 1, wherein the two-phase stainless steel has the following composition: Cr: 24 to 26 mass %, Mo: 2.5 to 3.5 mass %, Ni: 5.5 to 7.5 mass %, C: 0.03 mass % or less, and N: 0.08 to 0.3 mass %, with the balance consisting of Fe and unavoidable impurities.

4. A diaphragm, comprising the metal elastic element according to claim 3.

5. The metal elastic element according to claim 1, wherein after loading a test load which is 52 to 80% of the proof stress, a residual displacement after unloading is 1.3 μm or less.

6. The metal elastic element according to claim 5, wherein the two-phase stainless steel has the following composition: Cr: 24 to 26 mass %, Mo: 2.5 to 3.5 mass %, Ni: 5.5 to 7.5 mass %, C: 0.03 mass % or less, and N: 0.08 to 0.3 mass %, with the balance consisting of Fe and unavoidable impurities.

7. A diaphragm, comprising the metal elastic element according to claim 5.

8. A diaphragm, comprising the metal elastic element according to claim 6.

* * * * *